Dec. 24, 1968  W. A. SCHEUBLEIN, JR., ET AL  3,418,011
WEAR-COMPENSATING BALL JOINTS
Filed May 31, 1966  3 Sheets-Sheet 1

INVENTORS:
WILLIAM A. SCHEUBLEIN JR.
LOUIS P. FISTER
BY Gravely, Lieder & Woodruff
ATTORNEYS.

INVENTORS:
WILLIAM A. SHEUBLEIN JR.
LOUIS P. FISTER
BY Gravely, Lieder & Woodruff
ATTORNEYS.

Dec. 24, 1968  W. A. SCHEUBLEIN, JR., ET AL  3,418,011
WEAR-COMPENSATING BALL JOINTS
Filed May 31, 1966  3 Sheets-Sheet 3

INVENTORS;
WILLIAM A. SCHEUBLEIN JR.
LOUIS P. FISTER
BY Gravely, Lieder & Woodruff
ATTORNEYS.

United States Patent Office 3,418,011
Patented Dec. 24, 1968

3,418,011
WEAR-COMPENSATING BALL JOINTS
William A. Scheublein, Jr., Ballwin, and Louis P. Fister, St. Louis, Mo., assignors to Moog Industries, Inc., St. Louis, Mo., a corporation of Missouri
Filed May 31, 1966, Ser. No. 553,758
10 Claims. (Cl. 287—87)

ABSTRACT OF THE DISCLOSURE

A movable joint device for connecting two parts which have at least relative rotational movement, the device including housing having a bearing seat for a load transmitting stud and means periodically adjusting for wear or looseness due to wear between the stud and its seat. The periodically adjusting mean consists in two relatively movable parts which are able to take up looseness when one turns with the stud or housing and the other remains relatively stationary due to means exerting a drag or friction force which checks movement thereof.

---

This invention relates to improvements in ball joint devices, and is especially directed to the inclusion of wear compensating means in ball joints.

A major problem in ball joint devices, especially for application to the steerable wheels of automobiles, is the control over the looseness which inevitably develops after a period of operation. Automobiles are constantly driven in conditions which impose a severe rate of wear on the movable parts of the ball joints. The ball joint wear can be rapidly accelerated by overloading the automobile or other vehicle, by lack of proper maintenance and lubrication, and prolonged service in conditions of dirt and grit getting into the working parts. Looseness in the ball joint means uncertain steering control which is a dangerous condition for a vehicle to tolerate for any length of time.

It is a primary object of the present invention to provide a ball joint with wear compensating means that is exceedingly simple in construction and operation, and which operates on a continuous basis.

It is also a principal object of the present invention to provide a ball joint with an arrangement of parts and components which have in normal operation a sufficient degree of relative movement to be utilized for actuating wear compensating means such that the frictional wear in the parts of the ball joint may be continuously adjusted.

It is an object of the present invention to provide a ball joint with two principal relatively movable members and to incorporate wear compensating means within the ball joint that will be rendered effective by the relative rotary movement between the two members without interference with angular or other movement therebetween.

It is another object of the present invention to provide a wear compensating unit that can be inserted in a ball joint assembly to replace other parts and to convert the ball joint into a wear compensating ball joint.

A further object of the present invention is to provide a ball joint with wear compensating means which can discriminate between rotary and oscillatory movement and utilize only one of such motions to render the wear compensating means operative.

Still another object of the present invention is to provide a ball joint with an improved and unique wear compensating assembly which is operative upon the development of differential friction forces within the assembly.

Still a further object of the present invention is to provide a ball joint assembly with wear compensating means that utilize friction forces as well as magnetic forces for energizing the wear compensating function.

Other objects and advantages of the present invention will be set forth in the following specification which relates to certain preferred forms of ball joints, and reference will also be had to the accompanying drawings, wherein.

Generally, the ball joint structure appearing in the accompanying drawings includes a housing formed to provide a socket for the reception of the head end of a stud. The stud head is suitably mounted in the housing socket so that it may have rotary movement about the longitudinal axis of the stud, or it may have angular or swinging movement within the socket. It is, of course, understood that the housing is usually connected to one portion of the vehicle and the shank of the stud is connected to another portion of the vehicle, such portions of the vehicle being permitted relative movement of a type which may, and usually does, include both rotary and angular movement as defined above.

The improved wear compensating means is incorporated in movable joint devices and relies upon relative rotary movement between the housing and stud of a ball joint. Such rotary movement is utilized to actuate means for adjusting out frictional wear in the stud relative to the housing, hence looseness can never develop. The compensating means, for example, includes two relatively movable elements disposed to tighten up on the stud head when it becomes loose, such tightening action being possible because one element frictionally engages the stud head with a force greater than the friction force of engagement between the two elements, and because the one element not engaged with the stud head is held against rotation by friction imparting drag means. To achieve this mode of operations the following conditions must obtain:

(a) At least two members of the ball joint must be engaged such that when relative rotary movement occurs in one direction the frictional wear which could develop will be adjusted out, but rotary movement in an opposite direction will be prevented from undoing the above described correction.

(b) The ball joint assembly must have the components and parts thereof arranged to introduce differential frictional forces which are selectively rendered effective upon relative rotation of the housing and the stud, so that the frictional forces can be changed in magnitude between the various components to effect the necessary energization of the wear compensating means and to prevent reverse operation of such means.

Figure 1:
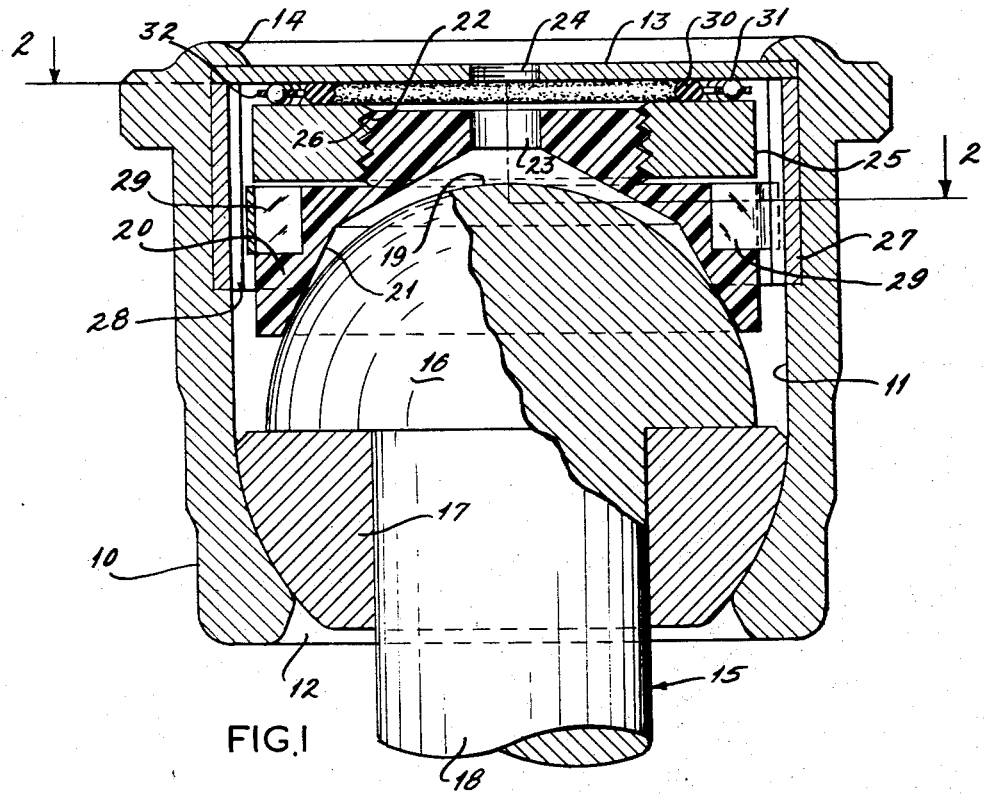
FIG. 1 is a vertical sectional view of a ball joint embodying the features and components of wear compensating means which is a part of the present invention.
Figure 2:
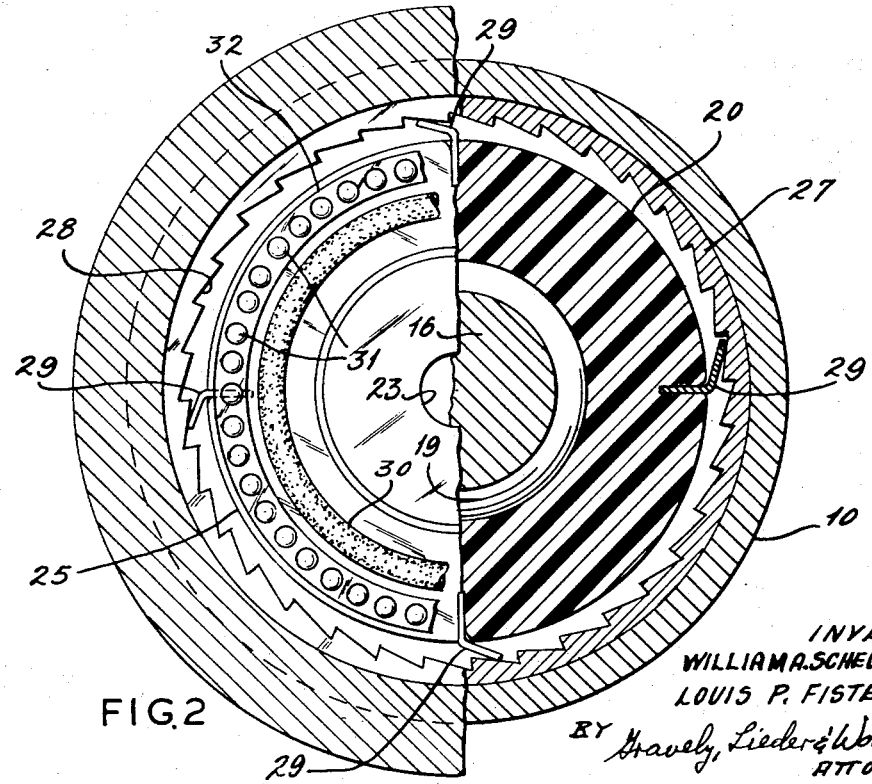
FIG. 2 is a sectional plan view taken at line 2—2 in FIG. 1.

Turning now to FIGS. 1 and 2, there is illustrated a ball joint which includes a housing 10 having a socket 11 formed therein with a constricted aperture 12 in one end. The opposite end of the housing is closed by a cover 13 which is secured in position by spinning over the flange 14. A stud 15 has its head end 16 mounted in the socket 11 upon a suitable bearing 17 so that the shank 18 of the stud projects through the aperture 12 and is free to oscillate or swing from side to side within the limits of the aperture 12. Also the stud 15 is free to rotate about the longitudinal axis of the shank 18.

Between the semi-spherically shaped surface 18 of the stud head 16 and the cover 13 there is disposed the unique and improved wear compensating means of this invention. The wear compensating means includes a thrust element 20 engaged upon the stud head surface 19 at the frusto-conical surface 21 formed internally of the thrust element. The thrust element is also formed with an upper projection having external threads 22 formed thereon and with an axial passage 23 for the introduction of lubricant to the working parts of the ball joint. While not shown, the cover 13 is provided with a suitable lubricant introducing fitting which may be mounted in the threaded aperture 24 of the cover 13. A reaction element 25 is formed with internal threads 26 which engage the threads 22 on the thrust element 20. The assembly and positioning of the thrust and reaction elements is such that upon relative rotation of these two parts in the proper direction the thrust element 20 will bear down on the stud head surface 19 and the reaction element will move upwardly toward the cover 13.

Means to control the action of the thrust and reaction elements, as shown in FIGS. 1 and 2, includes a fixed ring 27 formed with a series of inwardly directed projections or teeth 28 which are circumferentially spaced for cooperation with a plurality of fingers 29 which are suitably fixed in the outer periphery of the thrust element 20. It can be seen in FIG. 2 that the teeth 28 and fingers 29 are designed to permit relative rotary movement between the thrust element 20 and the ring 27 in one direction but at least one finger 29 is operative to prevent rotation in an opposite direction. For example, in the ball joint shown the relative movement is permitted in a clockwise direction but is prevented in the counterclockwise direction with respect to movement of the thrust element and assuming that the ring 27 and the housing 10 in which it is secured are stationary. The ring 27 is secured in the wall of the socket 11 and is prevented from displacement by the cover 13 and the flange 14.

Also shown in FIGS. 1 and 2 is means for imposing a limited frictional drag on the rotary movement of the reaction element 25. This means comprises an elastic or resilient ring 30 which is compressed between the cover 13 and the opposed face of the reaction element 25. The engagement of the ring 30 with the surface of the cover and the reaction element establishes friction surfaces which impose a drag on the freedom of the reaction element 25 to rotate within the housing with the rotation of the thrust element 20. Adjacent the resilient ring 30 are a series of rigid ball elements 31 and the ball elements are intended to limit the amount of compression which can be imposed on the ring 30 by axial movement of the reaction element 25 relative to the cover 13. Suitable cage means 32 is provided for retaining balls 31 in position, such means may be similar to typical ball cages for anti-frictional ball bearing assemblies.

Figure 3:
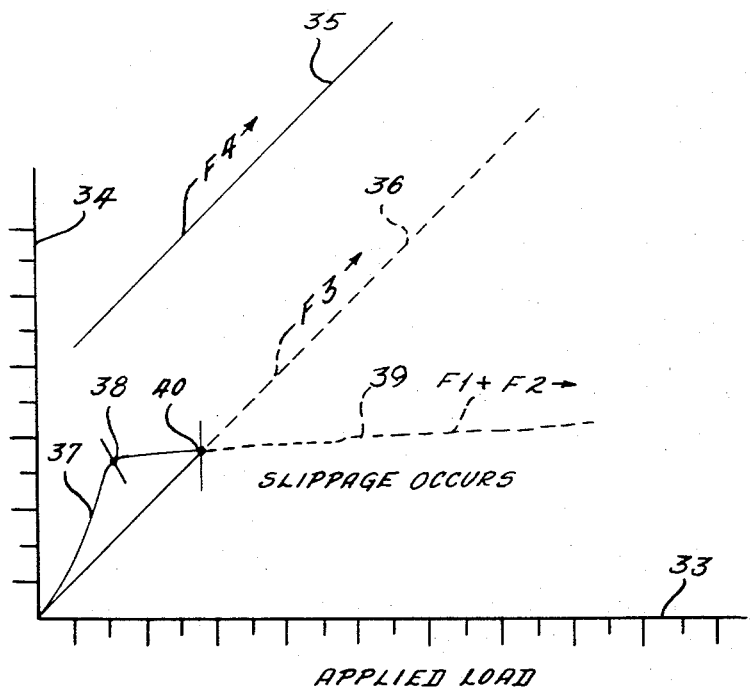
FIG. 3 is a graphic analysis of the principles of operation of the ball joint shown in FIGS. 1 and 2.

Turning now to FIG. 3, there is shown in graphic form the characteristics of operation of the wear compensating assembly in the ball joint of FIGS. 1 and 2. In the graph the abscissa 33 represents the axially applied operating force on the stud shank 18 forcing the stud head 16 against the thrust element 20. The ordinate 34 represents the frictional reaction force developed on the various friction surfaces between the components of the wear compensating assembly. In view of the one directional character of the fingers 29 carried by the thrust element 20, the surface friction developed between the stud head surface 19 and the frusto-conical surface 21 of the thrust element requires a sufficiently high friction force to cause the rotation of the stud head 16 to drive the thrust element 20 in one direction where the fingers 29 will pass over the teeth 28, but on reverse rotation of the stud head 16 there must be freedom of the stud head to rotate relative to the frusto-conical surface 21 on the thrust element 20. Furthermore, because of the freedom of the stud 15 to swing angularly or oscillate the stud head 19 must be free to permit this swinging movement relative to the thrust element 20 which is limited to axial displacement only.

The abutment between the surfaces 19 and 21 is represented by the line 35, and it can be appreciated that the frusto-conical surface 21 develops large frictional resistance at low loading on the ball joint stud. The friction reaction forces builds up in a substantially straight line relationship with increase in the applied load. The graph line 36 represents the relationship between load applied on the ball joint along the abscissa 33 and the reaction friction force along the ordinate 34 which is developed in the engaged threads 22 and 26 between the thrust element 20 and the reaction element 25. For the sake of simplicity in the following description the friction forces developed along the line 35 will be referred to hereafter as friction reaction forces F4 and the friction reaction forces developed along the line 36 will be referred to as F3. In the same way the graph of FIG. 3 depicts the friction reaction force which is developed in the initial assembly of the ball joint by the elastic ring 30 and since this ring is resilient or compressible, the friction reaction forces F1 characteristically builds up quite rapidly with small increments of applied load. This friction versus force characteristic is shown at line 37. The ring of balls 31 adjacent the resilient friction ring 30 are non-compressible and therefore prevent the friction reaction force in the ring 30 from increasing beyond a certain predetermined maximum represented at point 38. Beyond the point 38 applied load on the ball joint may have some inconsequential effect by causing the balls 31 to indent in the reaction element 25 or in the cover 13. This loading is represented by the line 39 which extends from the maximum point 38 along a generally horizontal path showing that a rapid increase in the load applied on the ball joint does not result in significant increase in the friction reaction force of the resilient ring 30 combined with the inelastic balls 31. Therefore, the friction reactive force represented by the line 39 extending from the maximum point 38 will be referred to in terms of friction reaction force F1 plus F2, where F2 is the friction reaction force component of the balls 31 between the cover 13 and the reaction element 25.

In FIG. 3 the friction reaction force line 39 crosses the line 36 representing the friction reaction force between elements 20 and 25 at the point 40. This point 40 on the graph indicates that F3 becomes equal in magnitude to F1+F2; therefore, relative rotary motion will occur between the cover plate 13 and the reaction element 25. This means that the reaction element 25 and the thrust element 20 will rotate in the adjusting direction with the stud head 16, and the balls 31 will permit such rotation by rolling on the surface of the cover plate 13. However, in the non-adjusting direction, there will be slippage between the thrust element 20 and the stud head 16, since at least one of the fingers 29 will prevent the thrust element 20 from rotating relative to the housing. As frictional wear develops within the ball joint due to operation, the friction force F3 (within the threads 22 and 26) will fall below the point 40. Then the combined value of F1 and F2 becomes greater than the friction reaction force F3 in the threads, and at this point the reaction element 25 will become relatively stationary and will not turn with the thrust element 20.

During this operation of the ball joint wear compensating means the thrust element 20 becomes active during periods when the stud head 16 rotates clockwise as viewed in FIG. 2, to turn the thrust element 20 relative to the reaction element 25. This turning feeds the thrust element downwardly and the reaction element upwardly to expand these elements between the stud head surface 19 and the inner side of the cover 13. This expansion of the elements corrects for frictional wear in the ball joint assembly. It is now appreciated that in the normal operation of the ball joint assembly the friction forces will fluctuate somewhat on opposite sides of the point 40 and will fall either along line 36 or along line 39 toward the maximum point 38. In the foregoing description of FIG. 3 reference is made to the graph lines 36 and 39, and in each instance these lines to the right of the maximum point 40 are shown as dotted lines to emphasize the fact that when the friction reaction force F3 increases above the point 40 it signifies that the elements 20 and 25 move together which will therefore prevent the threads from relative movement and no friction reactive forces can be generated above the point where the threads work together. This same explanation will explain why the line 39 is a broken line to the right of point 40, because to the right of point 40 the friction reaction force F1 and F2 become greater than the friction reaction force F3 so that the reaction element 25 ceases to move.

Figure 6:
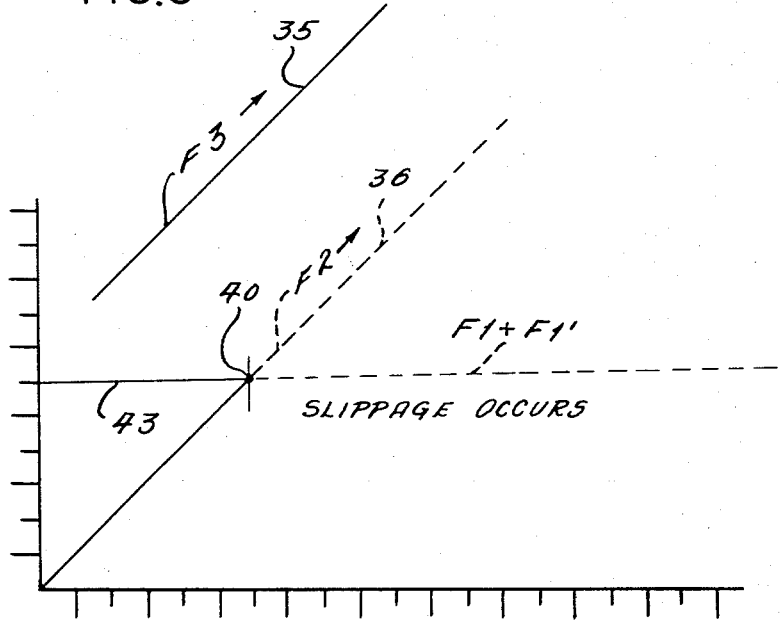
FIG. 6 is a graphic analysis of the principle of operation of the ball joint illustrated in FIGS. 4 and 5.
Figure 4:
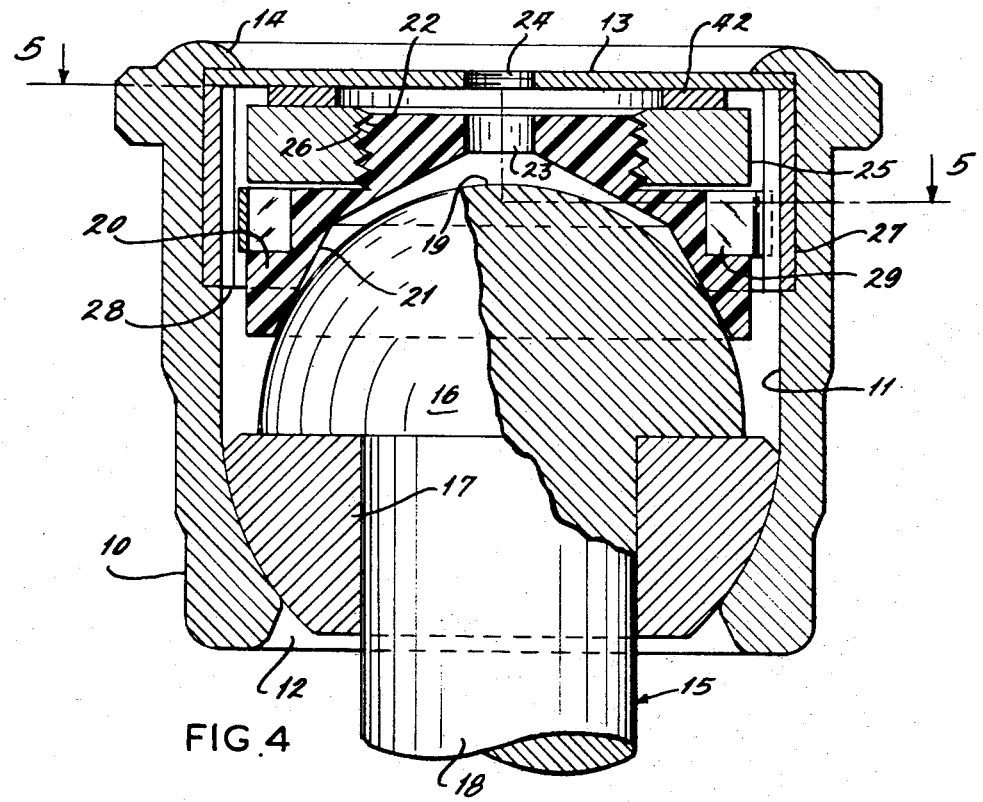
FIG. 4 is a vertical sectional view of a modified ball joint forming a part of the present invention.
Figure 5:
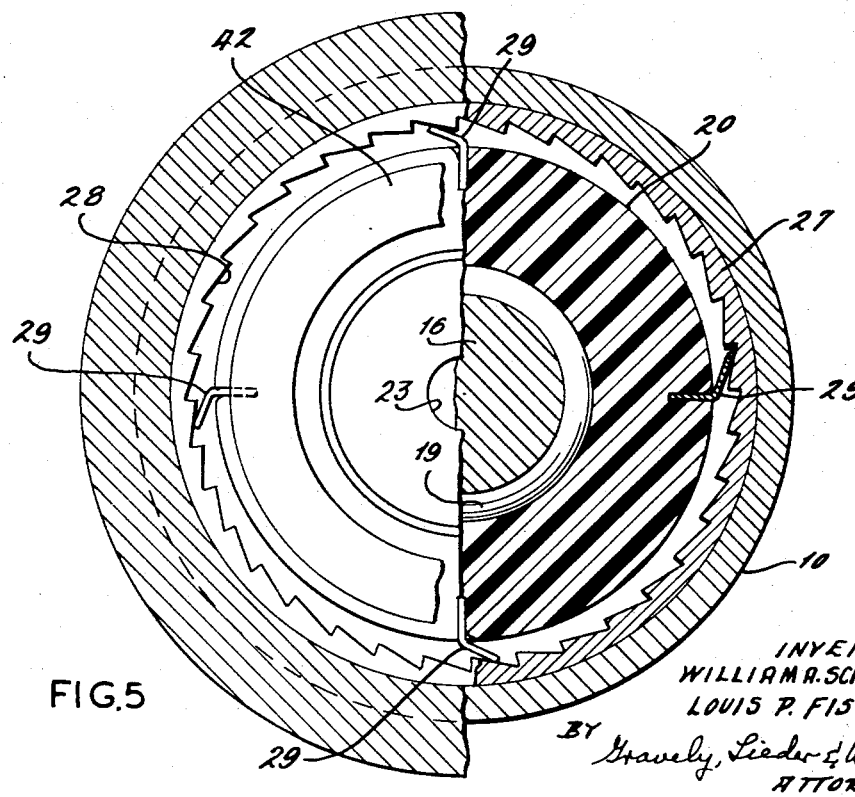
FIG. 5 is a sectional plan view taken at line 5—5 in FIG. 4.

Turning now to FIGS. 4 and 5, it can be seen that the ball joint is substantially similar to that shown in FIGS. 1 and 2, and the following description will use the same characteristics of reference wherever possible. Since it will not be necessary to redescribe the parts and components of the ball joint in FIGS. 4 and 5 that are common to those seen in FIGS. 1 and 2, it will suffice to point out that the significant difference is the elimination of the resilient ring 30 and the ring of non-elastic balls 31. In the assembly of FIG. 4 a magnetic ring 42 is disposed between the surface of the reaction element 25 and the adjacent surface of the cover 13. The reaction element 25 is composed of a magnetic material in order to be responsive to the ring 42, but the element 25 must at times move with respect to the magnet 42 and there is, therefore generated on the surface of the magnet 42 a certain friction drag on the reaction element 25, which frictional drag in the graph of FIG. 6 is represented by the line 43 and is relatively constant because of the fact that it is a magnetic friction reaction force. In other respects the graph of FIG. 6 has the line 36 previously described and the transition point 40, as well as the line 35. The friction reaction force betwen threads 22 and 26 is now denoted as the force F2 instead of as previously denoted F3. Similarly the friction reaction force between the stud head surface 19 and the frusto-conical surface 21 is denoted as force F3, whereas in FIG. 1 it was denoted F4. These slight differences do not change the relative action and reaction between the various components of the ball joint in FIG. 4 and the description of FIG. 6 follows closely the description heretofore given of FIG. 3. The difference in the graphs is represented by the line 43 which indicates relatively constant friction force for the useful range of applied load on the ball joint, but in FIG. 3 the line 37 is representative of resilient means which builds up to a maximum point 38 where the balls 31 stop out further action of ring 30.

In all forms of the present device the housing, stud and elements of the wear compensation unit can be made of any suitable material which will support the loads and forces. Usually the housings are made of stamped, forged or machined steel with wearing surfaces suitably hardened. The studs are formed of steel of various alloys and usually have hardened surfaces. The bearing elements may be made of suitable combinations of powdered metal, phenolic resins, sintered iron and the like. In the wear compensation units, it is desired that the relatively movable elements engaged by the inclined plane means be made, one from an elastomer and the other from metallic materials, such as steel.

The foregoing description of certain preferred forms of the presently improved ball joint discloses the principle of utilizing relative motion between two parts to actuate a wear compensating assembly which will render the ball joint constantly ready to adjust for wear. In the device shown it is apparent that the thrust element and the reaction element are inter-related by means of threads, but this means can be altered to embrace any equivalent inclined plane. It is, of course, the aim hereof to cover all forms of ball joint devices within the generic movable joint definition, including equivalents to those herein set forth in the description and drawings, and as hereinafter may be included within the scope of the appended claims.

What is claimed is:

1. A movable joint device comprising in combination: a housing having a socket therein; a stud having a headed end operably seated in said socket and a shank projecting from said housing, said housing and stud being relatively movable in rotation; a first element in said socket having a first surface engaged on said stud head and a second surface spaced therefrom, said second surface being inclined relative to said stud head; a second element carried by said first element at said second surface on said first element and being movable therewith, said second element having a surface matching with said inclined second surface of said first element; friction inducing drag means in said housing engaged between said second element and said housing, said drag means normally exerting a friction holding force upon said second element to prevent movement with said first element whereby stud rotation and the degree of frictional resistance between the said first element and the stud is in itself sufficient to rotate said first element along with the stud and relative to said second element along said second inclined surface to effect displacement of one of said elements relative to said housing to correct for wear in the movable joint device; and other means between said first element and said housing preventing movement of said first element in one direction of rotation of said element relative to said housing to prevent undoing the wear correction in the movable joint device.

2. The device of claim 1 wherein said inclined second surface on said first element is a screw thread, said matching surface of said second element is a compatible screw thread to operate with said first mentioned screw thread and said motion preventing means is free to move in the direction of wear correction.

3. The device of claim 1 wherein said drag means is a deformed elastic friction member between said second element and the housing, and rigid means adjacent said friction member to limit the extent of deformation of said latter member.

4. The device of claim 1 wherein said drag means is a magnetized member to retain said second element in position upon movement of said first element relative to said second element to correct for wear in the movable joint device.

5. In a movable joint device having wear compensating means therein, the improvement which comprises:
   (A) a housing for attachment to one of at least two relatively movable parts and having a socket therein;
   (B) a headed stud operably seated in said housing socket and having a shank projecting therefrom for connection to another movable part,
      (1) said stud head being at least rotatable relative to said housing and on wear developing being movable axially in said housing;
   (C) and wear compensating means in said device controlling the axial movement and hence the tightness condition of said headed stud seated in said housing socket, said wear compensating means including,
      (1) a thrust element engaged on said stud head at a first friction surface therebetween,
      (2) a reaction element engaged with said thrust element at a second and axially inclined friction surface therebetween, said thrust and reaction elements being relatively rotatable to each other to obtain axial displacement to effect wear compensation,
      (3) first means between said reaction element and said housing creating a frictional drag on the rotation of said reaction element, (4) and second means between said thrust element and housing preventing rotational movement of said thrust element in one direction, and permitting rotation of said thrust element and said reaction element together in the opposite direction, (5) said wear compensating means being effective to adjust out wear whenever said frictional drag exceeds the friction at said second axially inclined friction surface so that said reaction element is held against rotation and the friction at said first friction surface will result in said thrust element rotating with said stud and relative to said reaction element in the said one direction not limited by said second means for increasing the friction at said friction surface beyond the said frictional drag.

6. The movable joint device set forth in claim 5 wherein the friction reaction forces at said first friction surface is greater than any other friction reaction force in said device.

7. The movable joint device set forth in claim 5 wherein said reaction element is carried on said thrust element at said second friction surface and rotates within said housing socket.

8. The movable joint device set forth in claim 5 wherein said headed stud is free to oscillate in said housing at said first friction surface without disturbing said thrust element.

9. The movable joint device set forth in claim 5 wherein said first means between said reaction element and said housing includes a resilient ring and a plurality of rigid rollers, said rollers acting to limit the friction reaction of said resilient ring on said reaction element.

10. The movable joint device set forth in claim 5 wherein said first means between said reaction element and said housing includes a magnetized ring, said reaction element being magnetically responsive, and said housing being magnetic.

References Cited
UNITED STATES PATENTS

| | | | |
|---|---|---|---|
| 2,593,253 | 4/1952 | Booth | 287—90 |
| 3,005,647 | 10/1961 | Collier | 287—90 |
| 3,103,377 | 9/1963 | Scheublein et al. | 287—90 |
| 3,325,197 | 6/1967 | Wehner | 287—90 |

CARL W. TOMLIN, *Primary Examiner.*

ANDREW V. KUNDRAT, *Assistant Examiner.*

U.S. Cl. X.R.

287—90